United States Patent
Bi et al.

(10) Patent No.: US 9,060,332 B2
(45) Date of Patent: Jun. 16, 2015

(54) METHOD AND DEVICE FOR SELECTING THE RESOURCE PROCESSING MANNER

(75) Inventors: Feng Bi, Guangdong (CN); Wei Gou, Guangdong (CN); Nan Zhao, Guangdong (CN); Changqing Zhu, Guangdong (CN); Yunfeng Sun, Guangdong (CN); Feng Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 1091 days.

(21) Appl. No.: 13/125,573

(22) PCT Filed: Feb. 5, 2009

(86) PCT No.: PCT/CN2009/070367
§ 371 (c)(1),
(2), (4) Date: Apr. 21, 2011

(87) PCT Pub. No.: WO2010/045791
PCT Pub. Date: Apr. 29, 2010

(65) Prior Publication Data
US 2011/0217986 A1 Sep. 8, 2011

(30) Foreign Application Priority Data
Oct. 22, 2008 (CN) .......................... 2008 1 0173410

(51) Int. Cl.
*H04W 72/00* (2009.01)
*H04W 40/22* (2009.01)
(Continued)

(52) U.S. Cl.
CPC .............. *H04W 40/22* (2013.01); *H04W 28/00* (2013.01); *H04W 28/0236* (2013.01);
(Continued)

(58) Field of Classification Search
CPC . H04W 28/00; H04W 28/0236; H04W 72/12; H04W 72/0231
USPC ....................................................... 455/452.2
See application file for complete search history.

(56) References Cited

U.S. PATENT DOCUMENTS

| | | | |
|---|---|---|---|
| 7,551,695 B2 * | 6/2009 | Speth ............................ | 375/341 |
| 7,729,696 B2 * | 6/2010 | Harris et al. ................ | 455/432.3 |
| 8,023,905 B2 * | 9/2011 | Wu et al. .......................... | 455/91 |
| 8,515,435 B2 * | 8/2013 | Krasny et al. ................. | 455/450 |

(Continued)

FOREIGN PATENT DOCUMENTS

| CN | 1889772 A | 1/2007 |
|---|---|---|
| CN | 101123742 A | 2/2008 |
| CN | 101185351 A | 5/2008 |

OTHER PUBLICATIONS

LG Electronics; "Network MIMO in LTE-Advanced"; 3GPP TSG RAN WG1 Meeting #54bis; RI-083653; Sep. 28, 2008; Prague, Czech Republic.

(Continued)

*Primary Examiner* — Asghar Bilgrami
(74) *Attorney, Agent, or Firm* — Walker & Jocke

(57) ABSTRACT

The present invention provides a method and device for selecting a resource processing manner, wherein the method is applied to a communication system including a user terminal, a relay station and a base station, and comprises the following operations: a configuring step of configuring a dedicated pilot, wherein the dedicated pilot is configured to measure parameters of a link from the relay station to the user terminal; an acquiring step of acquiring a first parameter value of a common pilot and a second parameter value of the dedicated pilot; a comparing step of comparing the first parameter value with the second parameter value; and a selecting step of selecting a resource processing manner according to the comparison result, wherein the resource processing manner comprises: a cooperation manner and/or a non-cooperation manner.

7 Claims, 5 Drawing Sheets

(51) Int. Cl.
*H04W 28/00* (2009.01)
*H04W 28/02* (2009.01)
*H04L 5/00* (2006.01)
*H04W 72/12* (2009.01)
*H04B 7/02* (2006.01)

(52) U.S. Cl.
CPC ............... *H04W 72/12* (2013.01); *H04B 7/026* (2013.01); *H04L 5/005* (2013.01); *H04L 5/0051* (2013.01); *H04L 5/0035* (2013.01)

(56) References Cited

U.S. PATENT DOCUMENTS 8,737,912 B2 * 5/2014 Ma et al. ........................ 455/9
2008/0240018 A1 10/2008 Xue et al.
2009/0190534 A1 * 7/2009 Yamada et al. ............... 370/328

OTHER PUBLICATIONS

European Patent Office, "Supplementary European Search Report"; for EP App. No. 09821512; Apr. 4, 2014; Munich, Germany.

* cited by examiner

METHOD AND DEVICE FOR SELECTING THE RESOURCE PROCESSING MANNER

FIELD OF THE INVENTION

The present invention relates to a communication field, in particular, to a method and a device for selecting a resource processing manner.

BACKGROUND OF THE INVENTION

At present, the research objective of B3G/4G is to aggregate access systems such as cells, fixed wireless access, nomadism, wireless regional area networks and so on, to provide, in combination with an all Internet Protocol (referred to as IP) network, for the user a wireless transmission capacity with a peak rate up to 100 Mbps and up to 1 Gbps respectively in a high-speed and a low-speed mobile environment, to enable seamless connection among a cellular system, regional area wireless network, broadcast and television satellite communication, and to realize "communication in any manner between a person and any other person or people at any time and at any place". Relay technology, as an effective application measure, not only can increase the coverage of a cell, but also can increase the capacity of a cell. However, the introduction of the Relay technology into the access system will cause a variety of problems including utilization of resources.

Time-frequency resource management is very important for an Orthogonal Frequency Division Multiplexing (referred to as OFDM) communication system, especially for a network into which a Relay Station (referred to as RS) is introduced. Generally, in a two-hop system, for data which needs to be transmitted to a User Terminal (referred to as UT), they are firstly transmitted by a Base Station (referred to as BS) to the RS in a Relay Zone, and then they are transmitted by the RS to the UT in an Access Zone. In the case that a relay station is introduced, during the above process of data transmission, the time-frequency resources occupied are two times as much as the time-frequency resources originally occupied when the BS directly transmits the data to the UT, which will lead to a decline of resource utilization.

Cooperation technology is a macrolevel or distributed Multiple Input Multiple Output (referred to as MIMO) system in a multi-hop system, and can be applied to Access or Relay up/down link The cooperation technology is similar to the macro-diversity between adjacent BSs, which is realized by using the cooperative transmission between the BS and each RS in a Multi-Relay (referred to as MR)-BS cell; that is, cooperative diversity is realized by using transmission antennas of different BSs and RSs to transmit relevant signals. Through the cooperation technology, the effect of space diversity can provide better performance of link Bit Error Rate (referred to as BER)/Block Error Rate (referred to as BLER), while, space multiplexing can bring forth higher spectral efficiency to the system.

Currently, researches on the cooperation technology mainly focus on the scheme or the algorithm. Regarding in what cases the cooperation manner is used in the presence of Relay, viz. the problem of how to select a non-cooperation manner or a cooperation manner, a solution has not yet been provided.

SUMMARY OF THE INVENTION

The present invention is provided in view of the problem that relevant technologies fail to show how to select a non-cooperation manner and/or a cooperation manner. Thus, the present invention aims at providing an improved solution for selecting a resource processing manner so as to fill the gap in the relevant technologies.

In order to achieve the above object, according to one aspect of the present invention, a method for selecting a resource processing manner is provided.

The method for selecting a resource processing manner according to the present invention is applied to a communication system including a user terminal, a relay station and a base station, and comprises the following steps: a configuring step of configuring a dedicated pilot, wherein the dedicated pilot is configured to measure parameters of a link from the relay station to the user terminal; an acquiring step of acquiring a first parameter value of a common pilot and a second parameter value of the dedicated pilot; a comparing step of comparing the first parameter value with the second parameter value; and a selecting step of selecting a resource processing manner according to the comparison result, wherein the resource processing manner comprises: a cooperation manner and/or a non-cooperation manner.

Preferably, the selecting step is: selecting the cooperation manner, if the comparison result is that the difference between the first parameter value and the second parameter value is more than a predetermined threshold; or selecting the non-cooperation manner, if the comparison result is that the difference between the first parameter value and the second parameter value is less than or equal to a predetermined threshold.

Preferably, the first parameter value and the second parameter value include one of the followings: power, signal-to-noise ratio, and signal-to-interference and noise ratio.

Preferably, the comparing step comprises one of the followings: the base station comparing a first parameter value with the second parameter value provided by the user terminal; and the user terminal comparing the first parameter value with the second parameter value, and transmitting the comparison result to the base station.

Preferably, the method further comprises: configuring the dedicated pilot to be transmitted on a same transmission antenna; or configuring the dedicated pilot to be transmitted on different transmission antennas.

According to another aspect of the present invention, a device for selecting a resource processing manner is provided.

The device for selecting a resource processing manner according to the present invention comprises: a configuring module, adapted to configure a dedicated pilot, wherein the dedicated pilot is configured to measure parameters of a link from a relay station to a user terminal; an acquiring module, adapted to acquire a first parameter value of a common pilot and a second parameter value of the dedicated pilot configured by the configuring module; a comparing module, adapted to compare the first parameter value acquired by the acquiring module with the second parameter value acquired by the acquiring module; and a selecting module, adapted to select a resource processing manner according to the comparison result of the comparing module, wherein the resource processing manner comprises: a cooperation manner and/or a non-cooperation manner.

Preferably, the selecting module further comprises: a first selecting sub module, adapted to select the cooperation manner, in the case that the comparison result of the comparing module is that the difference between the first parameter value and the second parameter value is more than a predetermined threshold; and a second selecting sub module, adapted to select the non-cooperation manner, in the case that the comparison result of the comparing module is that the difference between the first parameter value and the second parameter value is less than or equal to the predetermined threshold.

Preferably, the comparing module is located at one of the following entities: the user terminal and the base station.

Through the present invention, the resource processing manner is selected based on the result of the comparison between the parameter of the common pilot and the parameter of the dedicated pilot, which can settle the problem of how to select a non-cooperation manner and/or a cooperation manner, and can realize the selection of cooperation and non-cooperation manners after the introduction of Relay.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE ACCOMPANYING DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

Brief Description on Functions

The embodiments of the present invention provide a method and a device for selecting a resource processing manner, which can be applied in the Relay technology. In the method, a Dedicated Pilot is introduced to the link from the RS to the UT, the non-cooperation manner or cooperation manner is selected for processing, by comparing the parameter value of the Common Pilot with the parameter value of the Dedicated Pilot; wherein the Dedicated Pilot introduced to the link from the RS to the UT is specifically used for the measurement of the link from the RS to the UT, and the Dedicated Pilot also can be used during data demodulation; the above cooperation manner indicates that a plurality of transmission sources (e.g. BSs and RSs) transmit the same data to the receiving terminal (e.g. UT) at the same physical resource(s), and the non-cooperation manner indicates that a single transmission resource (e.g. BS or RS) transmits data to the receiving terminal (e.g. UT) at physical resource(s).

The present invention is described in detail with reference to the accompanying drawings in combination with the embodiments as follows. The embodiments of the present invention and the features of the embodiments can be combined with each other if there is no conflict.

Method Embodiments

Figure 1:
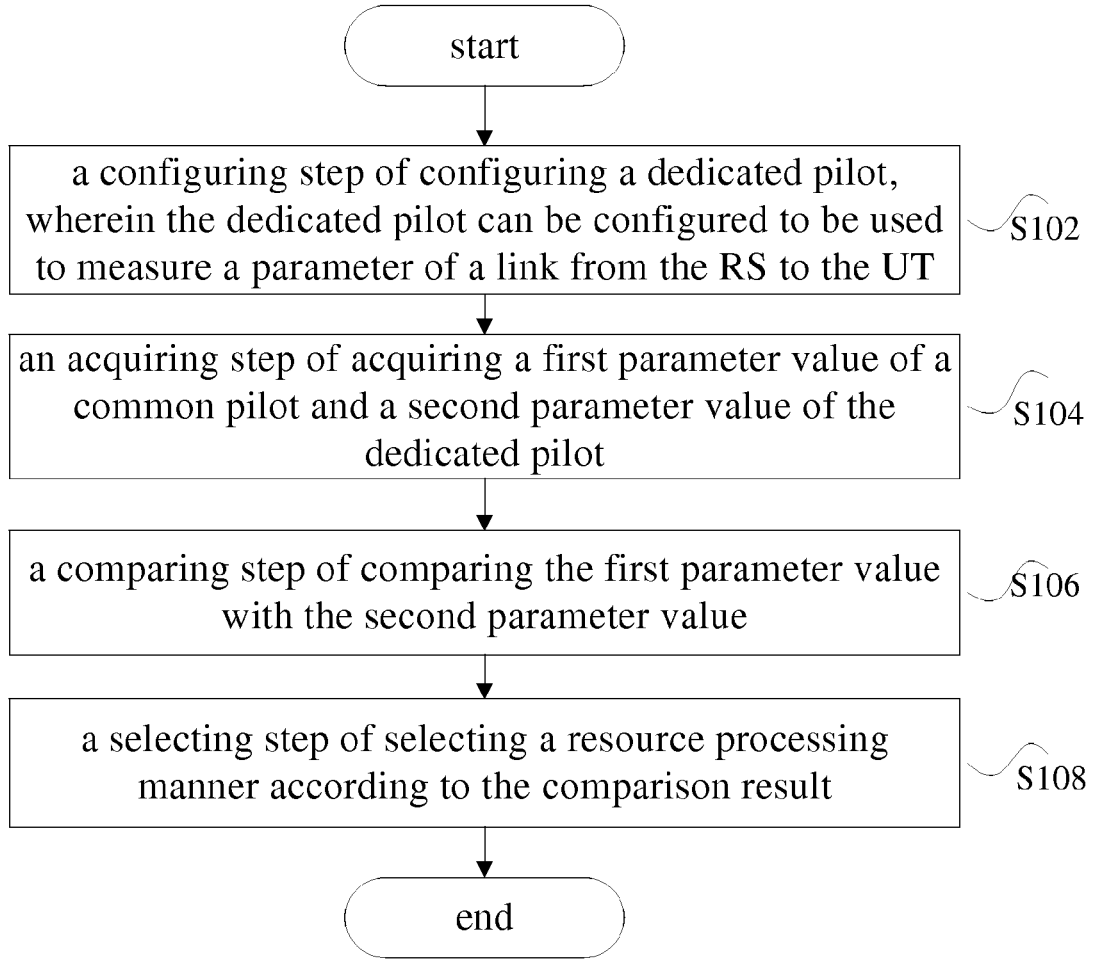
FIG. 1 is a flowchart of the method for selecting a resource processing manner according to an embodiment of the present invention.

According to an embodiment of the present invention, a method for selecting a resource processing manner is provided, which is applied in the communication system including a UT, an RS, and a BS. FIG. 1 is a flowchart of the method for selecting a resource processing manner according to an embodiment of the present invention. It shall be explained that the steps shown in the flow chart in the drawings can be executed in, for example, a computer system with a group of computer executable instructions. Moreover, although the logical order is shown in the flow chart, in some cases, the steps shown or described can be carried out in a different order.

As shown in FIG. 1, the method comprises steps S102 to S108 as follows:

step S102, a configuring step of configuring a Dedicated Pilot, wherein the Dedicated Pilot can be configured to measure parameters of a link from the RS to the UT;

particularly, after the introduction of the wireless communication system Relay, a Dedicated Pilot is added to the added link from the RS to the UT, the Dedicated Pilot can be used to measure parameters such as Power (referred to as P), Signal-to-Noise Ratio (referred to as SNR) or Signal-to-Interference and Noise Ratio (referred to as SINR) and so on; in order to reduce Pilot overhead more effectively, the Dedicated Pilot either can be transmitted only on a single transmission antenna, or can be transmitted on different transmission antennas by means of space hopping processing, so as to measure the parameters of different antennas;

step S104, an acquiring step of acquiring a first parameter value (Xc) of a Common Pilot and a second parameter value (Xd) of the Dedicated pilot, wherein the first parameter value and the second parameter value can include one of the followings: power, signal-to-noise ratio, and signal-to-interference and noise ratio; particularly, the UT under the RS measures the power Pc or SNRc or SINRc of the Common Pilot, and simultaneously measures the power Pd or SNRd or SINRd of the Dedicated Pilot;

step S106, a comparing step of comparing the first parameter value with the second parameter value; particularly, the step can be processed in one of the following ways: (1) the BS compares the first parameter value provided by the UT with the second parameter value provided by the UT; and (2) the UT compares the first parameter value and the second parameter value, and transmits the comparison result to the BS;

step S108, a selecting step of selecting a resource processing manner according to the comparison result, wherein the cooperation manner is selected if the comparison result is that the difference between the first parameter value and the second parameter value is more than a predetermined threshold; and the non-cooperation manner is selected if the comparison result is that the difference between the first parameter value and the second parameter value is less than or equal to a predetermined threshold; wherein the resource processing manner herein includes the cooperation manner and/or the non-cooperation manner described above.

Specifically, if the difference value between Xc and Xd is more than the predetermined threshold, it indicates that the UT receives two Common Pilots which are overlaid in the air, and the channel response obtained by the channel estimation is not accurate enough, which leads to an increase of bit error rate, thus the cooperation manner is used here to settle the problem of pilot conflict. The cooperation manner or the non-cooperation manner in which X can indicate P or SNR or SINR can be used for the remaining RS resources except the RS resources for which the cooperation manner is used, the other RS resources and the remaining BS resources.

If Xc and Xd are almost equal, viz. the difference between Xc and Xd is less than or equal to the predetermined threshold, it means that the UT does not receive multiple Common Pilots, and thereby, the non-cooperation manner is used here.

Through this embodiment, the resource processing manner is selected based on the result of the comparison between the parameter of the Common Pilot and the parameter of the Dedicated Pilot. The method can be carried out easily, settles the problem that relevant technologies fail to show how to select a non-cooperation manner and/or a cooperation manner, and realizes the selection between cooperation and non-cooperation manners after the introduction of Relay.

The process of implementing the embodiment of the present invention will be described in detail as follows.

Figure 2:
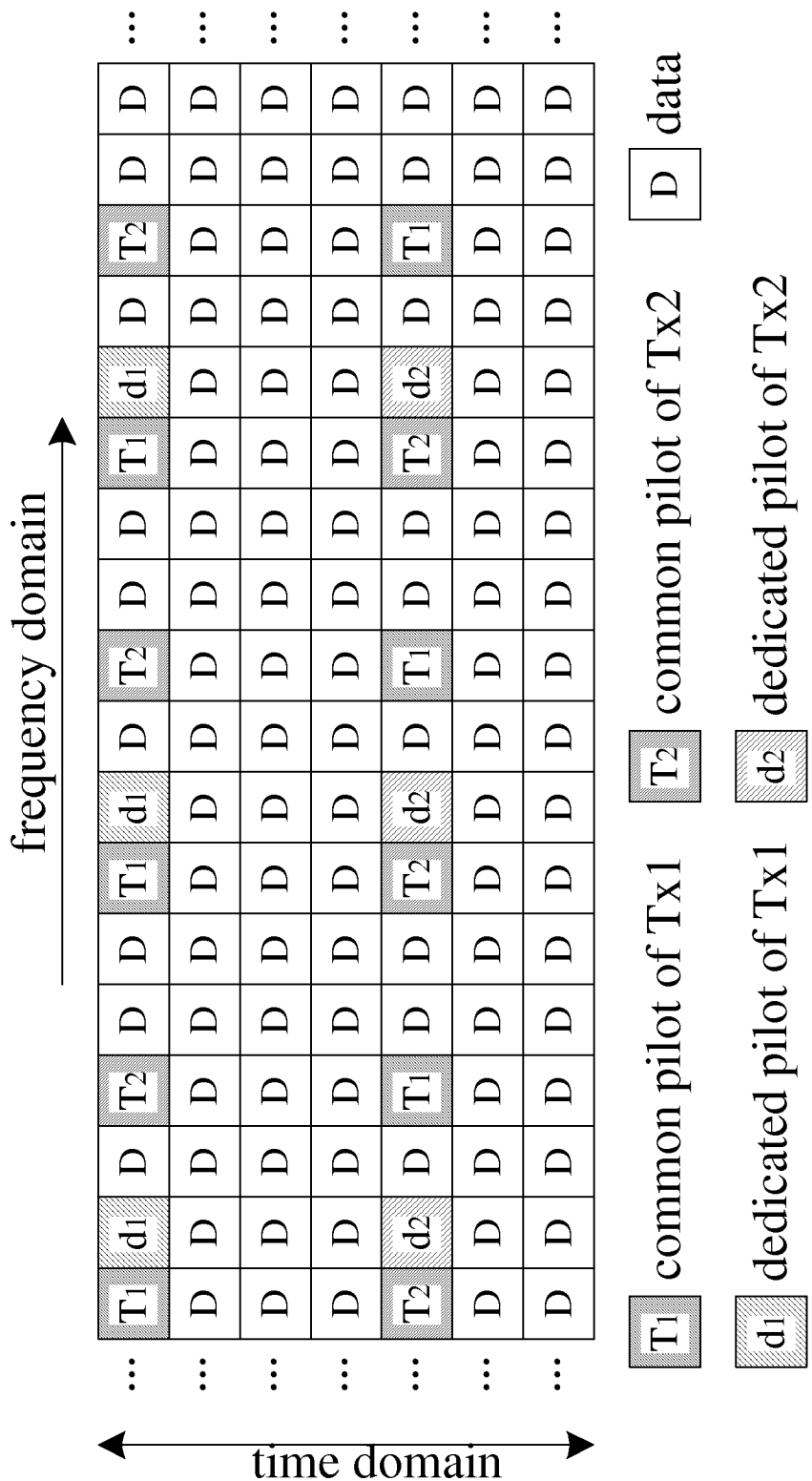
FIG. 2 is a schematic diagram of the pilot structure of two transmission antennas of RS according to an embodiment of the present invention.

FIG. 2 is a schematic diagram of the pilot structure of two transmission antennas of RS according to an embodiment of the present invention. As shown in FIG. 2, D represents data, T1 represents the Common Pilot of the transmission antenna Tx1, T2 represents the Common Pilot of the transmission antenna Tx2, d1 represents the Dedicated Pilot of the transmission antenna Tx1, and d2 represents the Dedicated Pilot of the transmission antenna Tx2.

The example of FIG. 2 shows a diagram sample of the pilot of two transmission antennas (Tx1 and Tx2). The interval of the Common Pilot of each transmission antenna in the direction of frequency is six subcarriers, the interval of the Common Pilots of the two transmission antennas in the direction of frequency is three subcarriers, and the Common pilots of the two transmission antennas are in staggered arrangement in the direction of time. The Common Pilot in FIG. 2 has the same structure as the structure of the Common Pilot in the link from the BS to the UT, except that a Dedicated Pilot is added at the position of subcarrier behind each antenna pilot subcarrier.

In the above, the above space hopping processing indicates: the interval of the Dedicated Pilot of the first transmission antenna in FIG. 2 in the direction of frequency is 6 subcarriers, and the interval between the Dedicated Pilot of the first transmission antenna and the Common Pilot of the first transmission antenna in the direction of frequency is 1 subcarrier, the interval of the Dedicated Pilot of the second transmission antenna in FIG. 2 in the direction of frequency is 6 subcarriers, and the interval between the Dedicated Pilot of the second transmission antenna and the Common Pilot of the second transmission antenna in the direction of frequency is 1 subcarrier.

Figure 3:
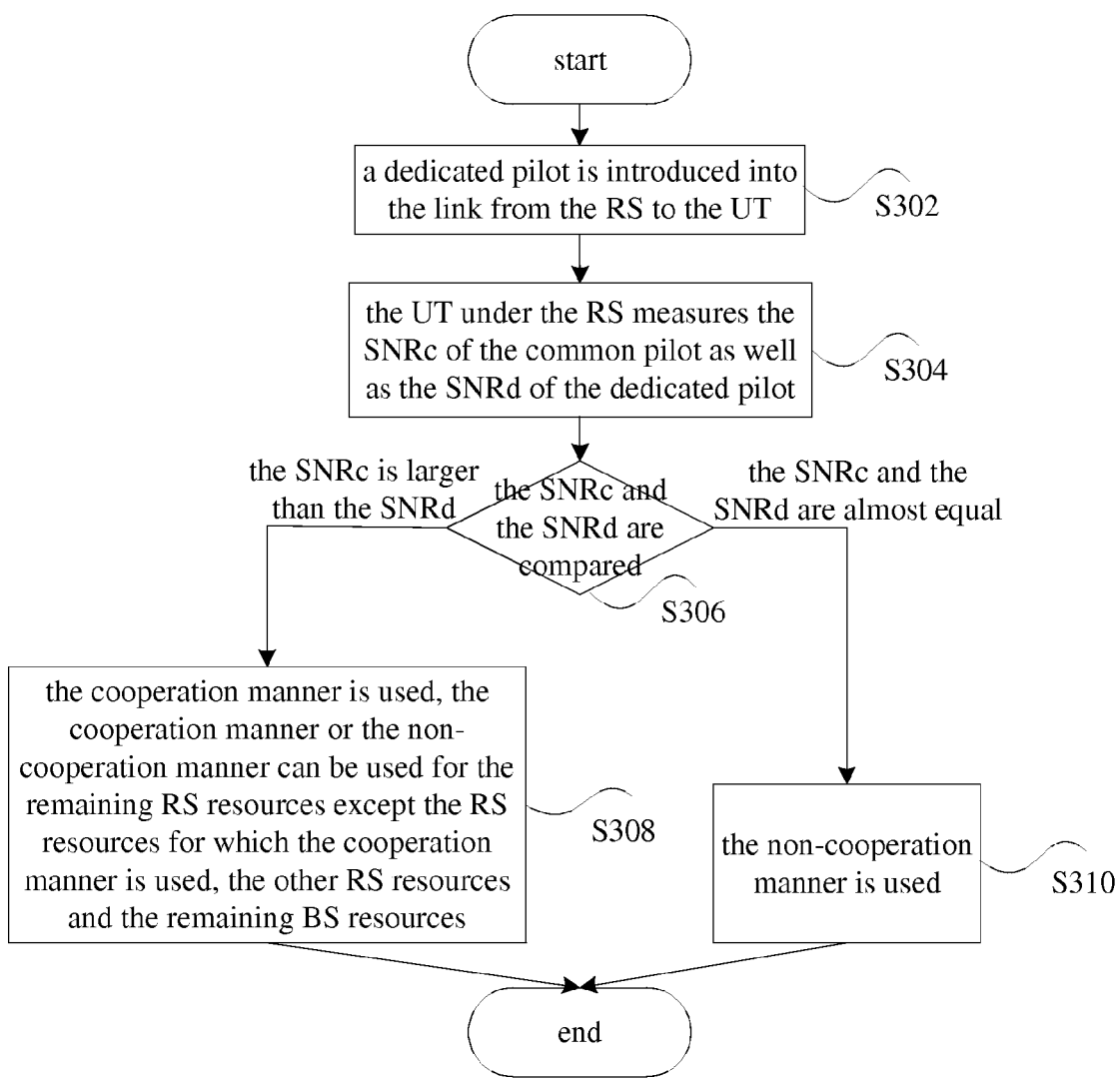
FIG. 3 is a detailed flowchart of the method for selecting a resource processing manner according to an embodiment of the present invention.

FIG. 3 is a detailed flowchart of the non-cooperation and cooperation processing methods according to an embodiment of the present invention. As shown in FIG. 3, the method includes step S302 to step S310. The method is described in conjunction with the schematic diagram of the pilot structure in FIG. 2 as follows:

step S302, a Dedicated Pilot is introduced into the link from the RS to the UT (viz. the above step S102);

step S304, during downlink transmission, the link from the BS to the UT only includes the diagram sample of the Common Pilot in FIG. 2, and the link from the RS to the UT includes the diagram sample of the Dedicated Pilot as shown in FIG. 2, thus, for the receiving terminal UT, it will receive 2 pilots, and thereby, the UT under the RS measures the SNRc of the Common Pilot as well as the SNRd of the Dedicated Pilot at the same time (viz. the above step S104);

step S306, the SNRc and the SNRd are compared (viz. the above step S106), in the case that the comparison result is that the SNRc is more than the SNRd, the flow continues to step S308, and in the case that the comparison result is that the SNRc and the SNRd are almost equal, the flow continues to step S310;

step S308, the cooperation manner is used for processing (viz. the above step S108), and here, the cooperation manner or the non-cooperation manner can be used for the remaining RS resources except the RS resources for which the cooperation manner is used, the other RS resources and the remaining BS resources;

particularly, if the UT is under the coverage of the BS and the RS simultaneously, it indicates that the Common Pilot received by the UT is an overlay of Common Pilots of the link from the BS to the UT and of the link from the RS to the UT, that is to say, the Common Pilot is undergoing interference, as the Dedicated Pilot only exists in the link from the RS to the UT and the Dedicated Pilot is not undergoing interference, the SNRc is more than the SNRd, here, the cooperation manner can be used to settle the problem of pilot conflict. After the cooperation manner is used for the BS and the RS, the cooperation manner or the non-cooperation manner can be used for the remaining RS resources except the RS resources for which the cooperation manner is used, the other RS resources and the remaining BS resources; for example, the frequency resources of the RS are 20 MHz, the cooperation manner is used for only 5 MHz bandwidth, and the cooperation or non-cooperation manner can be further selected for the remaining 15 MHz resources according to the method of the embodiments of the present invention;

step S310, the non-cooperation manner is used for processing (viz. the above step S108); specifically, if the UT is only under the coverage of the RS rather than under the coverage of the BS, it indicates that the Common Pilot received by the UT is only the Common Pilot of the link from the RS to the UT, that is, the Common Pilot does not suffer from interference as the Dedicated Pilot only exists in the link from the RS to the UT; similarly, the Dedicated Pilot does not suffer from interference either, therefore, the non-cooperation manner can be used here because SNRc and the SNRd are almost equal.

It shall be explained that, in the process of implementing this embodiment, the practice either can be that, after directly comparing the SNRc with the SNRd, the UT feeds back the comparison result to the BS, and the BS determines whether the cooperate manner or the non-cooperation manner is used; or can be that the UT feeds back the measured SNRc and SNRd to the BS, and the BS compares the values of the SNRc and the SNRd, and, after comparison, determines whether the cooperate manner or the non-cooperation manner is used.

This embodiment can realize the selection between the cooperation manner and the non-cooperation manner according to the comparison between the SNRc of the Common Pilot and the SNRd of the Dedicated Pilot.

Device Embodiments

Figure 4:
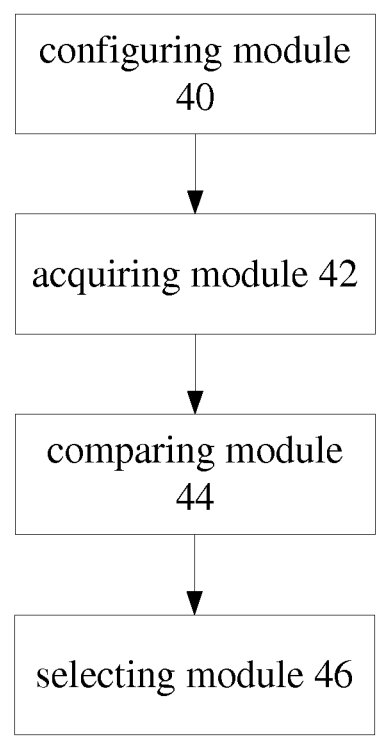
FIG. 4 is a structural block diagram of the device for selecting a resource processing manner according to an embodiment of the present invention.

According to an embodiment of the present invention, a device for selecting a resource processing manner is provided which can be applied for implementing the method for selecting a resource processing manner, for example, the device can be set or integrated to a base station, or can be set at the network side or the terminal side separately from the base station. FIG. 4 is a structural block diagram of the device for selecting a resource processing manner according to an embodiment of the present invention. As shown in FIG. 4, the device comprises: a configuring module 40, an acquiring module 42, a comparing module 44, and a selecting module 46. The structure is described as follows.

The configuring module 40 is adapted to configure a Dedicated Pilot, wherein the Dedicated Pilot is configured to measure parameters of a link from the RS to the UT.

The acquiring module 42, connected to the configuring module 40, is adapted to acquire a first parameter value of the Common Pilot and a second parameter value of the Dedicated Pilot which is configured by the configuring module 40.

The comparing module 44, connected to the acquiring module 42, is adapted to compare the first parameter value which is acquired by the acquiring module 42 with the second parameter value which is acquired by the acquiring module 42, wherein the comparing module 44 can be located at the UT or the BS.

The selecting module 46, connected to the comparing module 44, is adapted to select a resource processing manner according to the comparison result of the comparing module 44, wherein the resource processing manner includes the cooperation manner and/or the non-cooperation manner.

Particularly, the operation flow of the device shown in FIG. 4 includes the following processing procedures.

Firstly, the configuring module 40 configures the Dedicated Pilot in the link from the RS to the UT, wherein the Dedicated Pilot can be used to measure the parameter of the link form the RS to the UT; secondly, according to the configuration result of the configuring module 40, the acquiring module 42 acquires the second parameter value (viz. Xd as mentioned above) of the Dedicated Pilot, and acquires the first parameter value (viz. Xc as mentioned above) of the Common Pilot, wherein the first parameter value and the second parameter value can include one of the followings: power, signal-to-noise ratio, and signal-to-interference and noise ratio; particularly, the UT under the RS measures the power Pc or SNRc or SINRc of the Common Pilot, and simultaneously measures the power Pd or SNRd or SINRd of the Dedicated Pilot; thirdly, the comparing module 44 compares the first parameter value acquired by the acquiring module 42 with the second parameter value acquired by the acquiring module 42; finally, the selecting module 46 makes a selection (viz. the selection of the cooperation manner and/or the non-cooperation manner) for a resource processing manner according to the comparison result of the comparing module 44, particularly, if the comparison result is that the difference between the first parameter value and the second parameter value is more than a predetermined threshold, the cooperation manner is selected; or if the comparison result is that the difference between the first parameter value and the second parameter value is less than or equal to a predetermined threshold, the non-cooperation manner is selected.

This embodiment provides a device which enables the selection for the resource processing manner based on the result of the comparison between the parameter of the Common Pilot and the parameter of the Dedicated Pilot.

Figure 5:
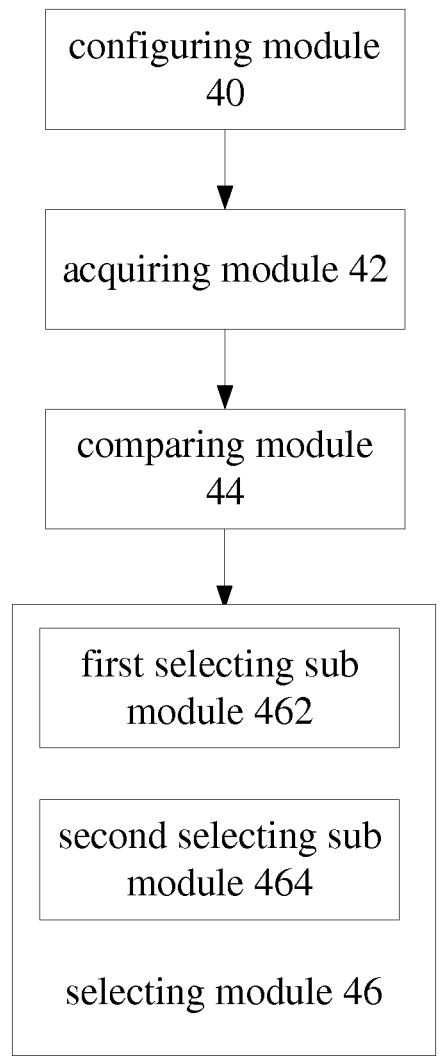
FIG. 5 is a preferable structural block diagram of the device for selecting a resource processing manner according to an embodiment of the present invention.

FIG. 5 is a preferable structural block diagram of the device for selecting a resource processing manner according to an embodiment of the present invention. As shown in FIG. 5, the selecting module 46 can further includes:

a first selecting sub module 462 adapted to select the cooperation manner, in the case that the comparison result of the comparing module is that the difference between the first parameter value and the second parameter value is more than a predetermined threshold; and a second selecting sub module 464 adapted to select the non-cooperation manner, in the case that the comparison result of the comparing module is that the difference between the first parameter value and the second parameter value is less than or equal to a predetermined threshold.

The operation flow of the device shown in FIG. 5 is similar to the operation flow of the device shown in FIG. 4, and will not be described here.

Through the above embodiments of the present invention, the resource processing manner can be selected based on the result of the comparison between the parameter of the Common Pilot and the parameter of the Dedicated Pilot. The method can be carried out easily, can settle the problem that relevant technologies fail to show how to select a non-cooperation manner and/or a cooperation manner, and can realize the selection between cooperation and non-cooperation manners after the introduction of Relay.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements and etc. within the spirit and principle of the present invention are all concluded in the scope of the present invention.

What is claimed is:

1. A method for selecting a resource processing manner, applied to a communication system including a user terminal, a relay station and a base station, the method comprising:
    a configuring step of configuring a dedicated pilot, wherein the dedicated pilot is configured to measure parameters of a link from the relay station to the user terminal;
    an acquiring step of acquiring a first parameter value of a common pilot and a second parameter value of the dedicated pilot;
    a comparing step of comparing the first parameter value with the second parameter value; and
    a selecting step of selecting a resource processing manner according to the comparison result, wherein the resource processing manner comprises: a cooperation manner and/or a non-cooperation manner, wherein the selecting step is:
    selecting the cooperation manner, if the comparison result is that the difference between the first parameter value and the second parameter value is more than a predetermined threshold; or
    selecting the non-cooperation manner, if the comparison result is that the difference between the first parameter value and the second parameter value is less than or equal to the predetermined threshold.

2. The method according to claim 1, wherein the first parameter value and the second parameter value comprise one of the followings:
    power, signal-to-noise ratio, and signal-to-interference and noise ratio.

3. The method according to claim 1, wherein the comparing step comprises one of the followings:

the base station comparing the first parameter value with the second parameter value provided by the user terminal; and the user terminal comparing the first parameter value with the second parameter value, and transmitting the comparison result to the base station.

4. The method according to claim 1, wherein the method further comprising:

configuring the dedicated pilot to be transmitted on a same transmission antenna; or configuring the dedicated pilot to be transmitted on different transmission antennas.

5. A device for selecting a resource processing manner, comprising:

a first hardware processor, adapted to configure a dedicated pilot, wherein the dedicated pilot is configured to measure parameters of a link from a relay station to a user terminal;

a second hardware processor, adapted to acquire a first parameter value of a common pilot and a second parameter value of the dedicated pilot configured by the first hardware processor;

a third hardware processor, adapted to compare the first parameter value acquired by the second hardware processor with the second parameter value acquired by the second hardware processor; and a fourth hardware processor, adapted to select a resource processing manner according to the comparison result of the third hardware processor, wherein the resource processing manner comprises: a cooperation manner and/or a non-cooperation manner, wherein the fourth hardware processor is further configured to:

select the cooperation manner, in the case that the comparison result of the third hardware processor is that the difference between the first parameter value and the second parameter value is more than a predetermined threshold; and select the non-cooperation manner, in the case that the comparison result of the third hardware processor is that the difference between the first parameter value and the second parameter value is less than or equal to the predetermined threshold.

6. The device according to claim 5, wherein the third hardware processor is located at one of the following entities:

the user terminal and the base station.

7. The method according to claim 3, wherein the first parameter value and the second parameter value comprise one of the followings:

power, signal-to-noise ratio, and signal-to-interference and noise ratio.

* * * * *